(12) United States Patent
Xie et al.

(10) Patent No.: US 12,422,859 B2
(45) Date of Patent: Sep. 23, 2025

(54) BRAIN-LIKE MEMORY-BASED ENVIRONMENT PERCEPTION AND DECISION-MAKING METHOD AND SYSTEM FOR UNMANNED SURFACE VEHICLE

(71) Applicant: SHANGHAI UNIVERSITY, Shanghai (CN)

(72) Inventors: Shaorong Xie, Shanghai (CN); Hang Yu, Shanghai (CN); Xiangfeng Luo, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 112 days.

(21) Appl. No.: 18/242,847

(22) Filed: Sep. 6, 2023

(65) Prior Publication Data
US 2024/0402705 A1    Dec. 5, 2024

(51) Int. Cl.
*G05D 1/243*     (2024.01)
*G05D 101/15*    (2024.01)
(Continued)

(52) U.S. Cl.
CPC ............. *G05D 1/243* (2024.01); *G06N 3/092* (2023.01); *G06V 10/40* (2022.01); *G06V 20/70* (2022.01);
(Continued)

(58) Field of Classification Search
CPC ............... G05D 1/243; G05D 2101/15; G05D 2109/34; G05D 1/644; G05D 2107/27;
(Continued)

(56) References Cited

U.S. PATENT DOCUMENTS

| | | | | |
|---|---|---|---|---|
| 2021/0357752 A1* | 11/2021 | Chen | ......................... | G06N 3/04 |
| 2023/0252344 A1* | 8/2023 | Mishima | ................. | G06N 20/00 |
| | | | | 706/12 |
| 2024/0420418 A1* | 12/2024 | Wu | ......................... | G06F 40/30 |

FOREIGN PATENT DOCUMENTS

| | | | | |
|---|---|---|---|---|
| CN | 109241912 A | * | 1/2019 | ............. G06F 40/30 |
| CN | 115587168 A | * | 1/2023 | |

(Continued)

OTHER PUBLICATIONS

Qi et al.; The Road to Know-Where: An Object-and-Room Informed Sequential BERT for Indoor Vision-Language Navigation; 2021 IEEE/CVF International Conference on Computer Vision (ICCV); pp. 1635-1644 (Year: 2021).*

(Continued)

*Primary Examiner* — Michael J Zanelli
(74) *Attorney, Agent, or Firm* — McLane Middleton, Professional Association

(57) ABSTRACT

The present disclosure relates to the technical field of decision-making of unmanned surface vehicles, and provides a brain-like memory-based environment perception and decision-making method and system for an unmanned surface vehicle. The method includes: obtaining an image of an environment in front of an unmanned surface vehicle; and inputting the image of the environment into an environment perception and decision-making model of the unmanned surface vehicle, and outputting an action instruction, where the environment perception and decision-making model of the unmanned surface vehicle includes an image feature extractor, a Bidirectional Encoder Representations from Transformers (BERT) model, a fully connected layer, a short-term scene memory module, and a long-term memory module that are connected in turn; the BERT model extracts an image feature representation containing a text feature (Continued)

from an image feature. The present disclosure improves accuracy of decision-making of an action.

8 Claims, 3 Drawing Sheets

(51) Int. Cl.
    *G05D 109/30*     (2024.01)
    *G06N 3/092*     (2023.01)
    *G06V 10/40*     (2022.01)
    *G06V 20/70*     (2022.01)

(52) U.S. Cl.
    CPC ..... *G05D 2101/15* (2024.01); *G05D 2109/34* (2024.01)

(58) Field of Classification Search
    CPC .. G05D 2111/10; G05D 1/0206; G06N 3/092; G06N 3/0442; G06N 3/045; G06N 3/0455; G06N 3/048; G06V 10/40; G06V 20/70; G06V 10/806; G06V 10/82; G06V 20/50; Y02T 10/40
    See application file for complete search history.

(56) References Cited

FOREIGN PATENT DOCUMENTS

| | | | | |
|---|---|---|---|---|
| EP | 3709207 A1 | * | 9/2020 | ........... G06F 16/245 |
| WO | WO-2022116441 A1 | * | 6/2022 | ............. G06N 3/045 |

OTHER PUBLICATIONS

Chen et al.; Brain-Inspired Cognitive Model With Attention for Self-Driving Cars; IEEE Transactions on Cognitive and Developmental Systems, vol. 11, No. 1, Mar. 2019; pp. 13-25 (Year: 2019).*
Jiao et al.; Brain-Inspired Remote Sensing Interpretation: A Comprehensive Survey; IEEE Journal of Selected Topics in Applied Earth Observations and Remote Sensing, vol. 16, 2023; pp. 2992-3033 (Year: 2023).*
English translation of Chinese application No. CN 2023106267091 filed May 30, 2023.

* cited by examiner

BRAIN-LIKE MEMORY-BASED ENVIRONMENT PERCEPTION AND DECISION-MAKING METHOD AND SYSTEM FOR UNMANNED SURFACE VEHICLE

CROSS REFERENCE TO RELATED APPLICATION

This patent application claims the benefit and priority of Chinese Patent Application No. 2023106267091, filed with the China National Intellectual Property Administration on May 30, 2023, the disclosure of which is incorporated by reference herein in its entirety as part of the present application.

TECHNICAL FIELD

The present disclosure relates to the technical field of decision-making of unmanned surface vehicles, and in particular, to a brain-like memory-based environment perception and decision-making method and system for an unmanned surface vehicle.

BACKGROUND

In the field of intelligent decision-making of an unmanned surface vehicle, an existing method often only uses reinforcement learning, takes external environmental information of the unmanned surface vehicle as an input, and designs a reward model to obtain a decision that maximizes a reward score. This type of method has a problem that the external environmental information is difficult to be accurately obtained under complex sea conditions. Even after all the external environmental information is obtained, it is difficult for a trained reinforcement learning model to make a most accurate decision based on the complex sea conditions.

SUMMARY

The present disclosure is intended to provide a brain-like memory-based environment perception and decision-making method and system for an unmanned surface vehicle, to improve accuracy of decision-making of an action.

To achieve the above objective, the present disclosure provides the following technical solutions:

A brain-like memory-based environment perception and decision-making method for an unmanned surface vehicle includes:
  obtaining an image of an environment in front of an unmanned surface vehicle;
  inputting the image of the environment into an environment perception and decision-making model of the unmanned surface vehicle, and outputting an action instruction, where the environment perception and decision-making model of the unmanned surface vehicle includes an image feature extractor, a Bidirectional Encoder Representations from Transformers (BERT) model, a fully connected layer, a short-term scene memory module, and a long-term memory module that are connected in turn; and
  using the action instruction to control the unmanned surface vehicle to perform an action; where
  the image feature extractor is configured to extract an image feature from the image of the environment; the BERT model is configured to extract an image feature representation containing a text feature from the image feature; the fully connected layer is configured to map the image feature representation onto an image query suitable for recognition by a large language model; the short-term scene memory module is configured to preset a plurality of questions, and use a short-term scene memory of the large language model to answer the plurality of questions in a specified order to obtain a plurality of answers; the long-term memory module is configured to use a long-term memory and in-context learning of the large language model to output the action instruction based on the plurality of answers; and the large language model is a large language model obtained after fine tuning based on reinforcement learning.

The present disclosure further provides a brain-like memory-based environment perception and decision-making system for an unmanned surface vehicle, including:
  an environment image obtaining module configured to obtain an image of an environment in front of an unmanned surface vehicle;
  a decision-making module for an environment perception and decision-making model of the unmanned surface vehicle configured to input the image of the environment into the environment perception and decision-making model of the unmanned surface vehicle, and output an action instruction, where the environment perception and decision-making model of the unmanned surface vehicle includes an image feature extractor, a BERT model, a fully connected layer, a short-term scene memory module, and a long-term memory module that are connected in turn; and
  a control module configured to use the action instruction to control the unmanned surface vehicle to perform an action; where
  the image feature extractor is configured to extract an image feature from the image of the environment; the BERT model is configured to extract an image feature representation containing a text feature from the image feature; the fully connected layer is configured to map the image feature representation onto an image query suitable for recognition by a large language model; the short-term scene memory module is configured to preset a plurality of questions, and use a short-term scene memory of the large language model to answer the plurality of questions in a specified order to obtain a plurality of answers; the long-term memory module is configured to use a long-term memory and in-context learning of the large language model to output the action instruction based on the plurality of answers; and the large language model is a large language model obtained after fine tuning based on reinforcement learning.

According to specific embodiments provided by the present disclosure, the present disclosure achieves following technical effects:

The present disclosure combines the large language model and the reinforcement learning, and uses a powerful multimodal representation capability and situational reasoning capability of the large language model to simulate collaborative decision-making performed by using a perceptual memory, a scene memory, a long-term memory, and a working memory of a human brain, so as to resolve a problem that it is difficult to perform environmental information perception and real-time accurate decision-making in intelligent decision-making of the unmanned surface vehicle.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other accompanying drawings can be derived from these accompanying drawings by those of ordinary skill in the art without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure is intended to provide a brain-like memory-based environment perception and decision-making method and system for an unmanned surface vehicle, to improve accuracy of decision-making of an action.

To make the above objectives, features, and advantages of the present disclosure clearer and more comprehensible, the present disclosure will be further described in detail below with reference to the accompanying drawings and specific implementations.

Embodiment 1

Figure 1:
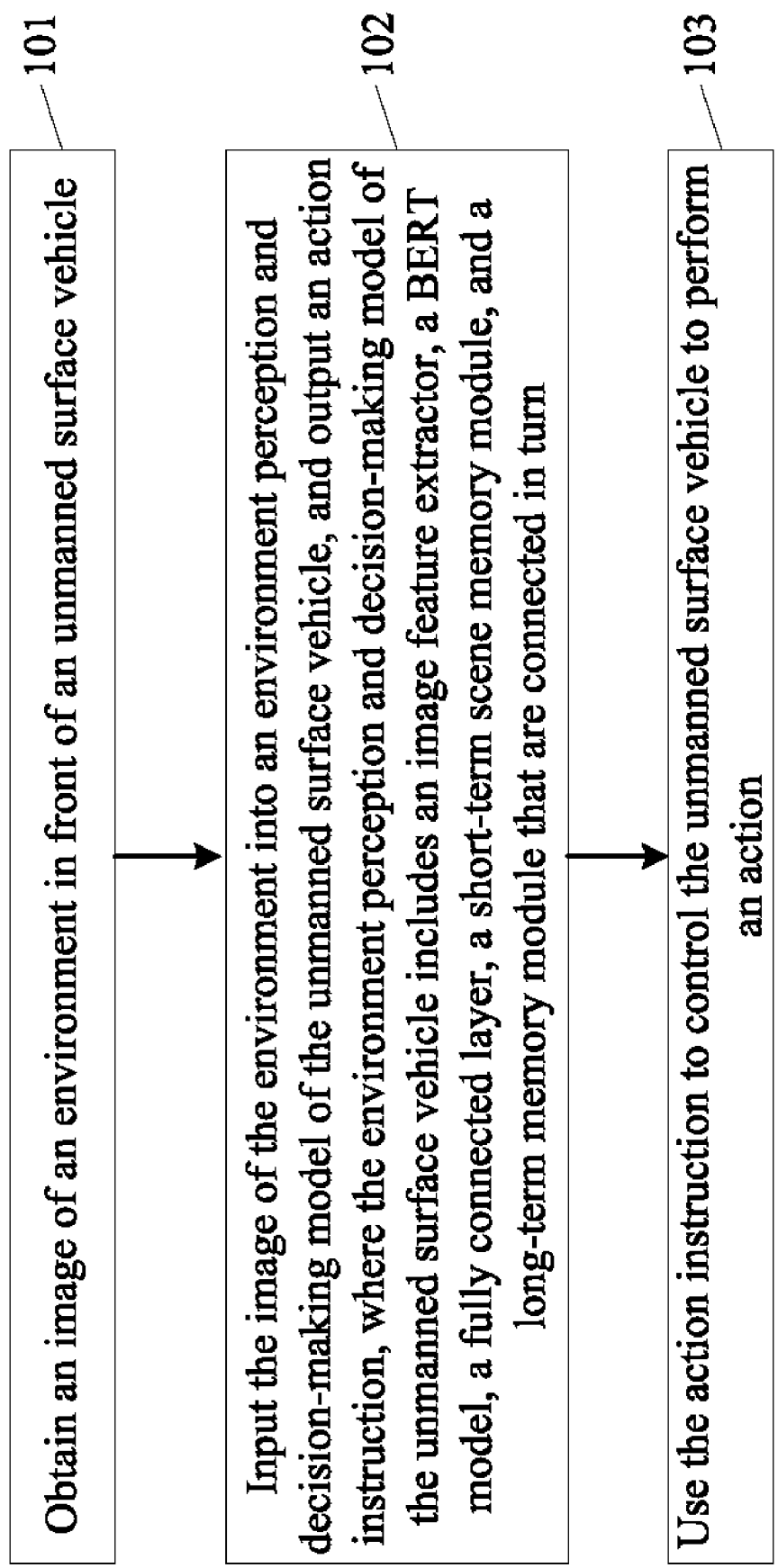
FIG. 1 is a schematic flowchart of a brain-like memory-based environment perception and decision-making method for an unmanned surface vehicle according to an embodiment of the present disclosure.

As shown in FIG. 1, this embodiment provides a brain-like memory-based environment perception and decision-making method for an unmanned surface vehicle. The method specifically includes following steps.

Step 101: Obtain an image of an environment in front of an unmanned surface vehicle.

Step 102: Input the image of the environment into an environment perception and decision-making model of the unmanned surface vehicle, and output an action instruction, where the environment perception and decision-making model of the unmanned surface vehicle includes an image feature extractor, a BERT model, a fully connected layer, a short-term scene memory module, and a long-term memory module that are connected in turn.

The action instruction includes changing a turning angle of the unmanned surface vehicle, changing a speed of the unmanned surface vehicle, changing a submergence depth of the unmanned surface vehicle, or the like.

Step 103: Use the action instruction to control the unmanned surface vehicle to perform an action.

The image feature extractor is configured to extract an image feature from the image of the environment. The BERT model is configured to extract an image feature representation containing a text feature from the image feature. The fully connected layer is configured to map the image feature representation onto an image query suitable for recognition by a large language model. The short-term scene memory module is configured to preset a plurality of questions, and use a short-term scene memory of the large language model to answer the plurality of questions in a specified order to obtain a plurality of answers. The long-term memory module is configured to use a long-term memory and in-context learning of the large language model to output the action instruction based on the plurality of answers. The large language model is a large language model obtained after fine tuning based on reinforcement learning.

The large language model may be GPT-4 or the like. The BERT model is a trained BERT model.

Figure 2:
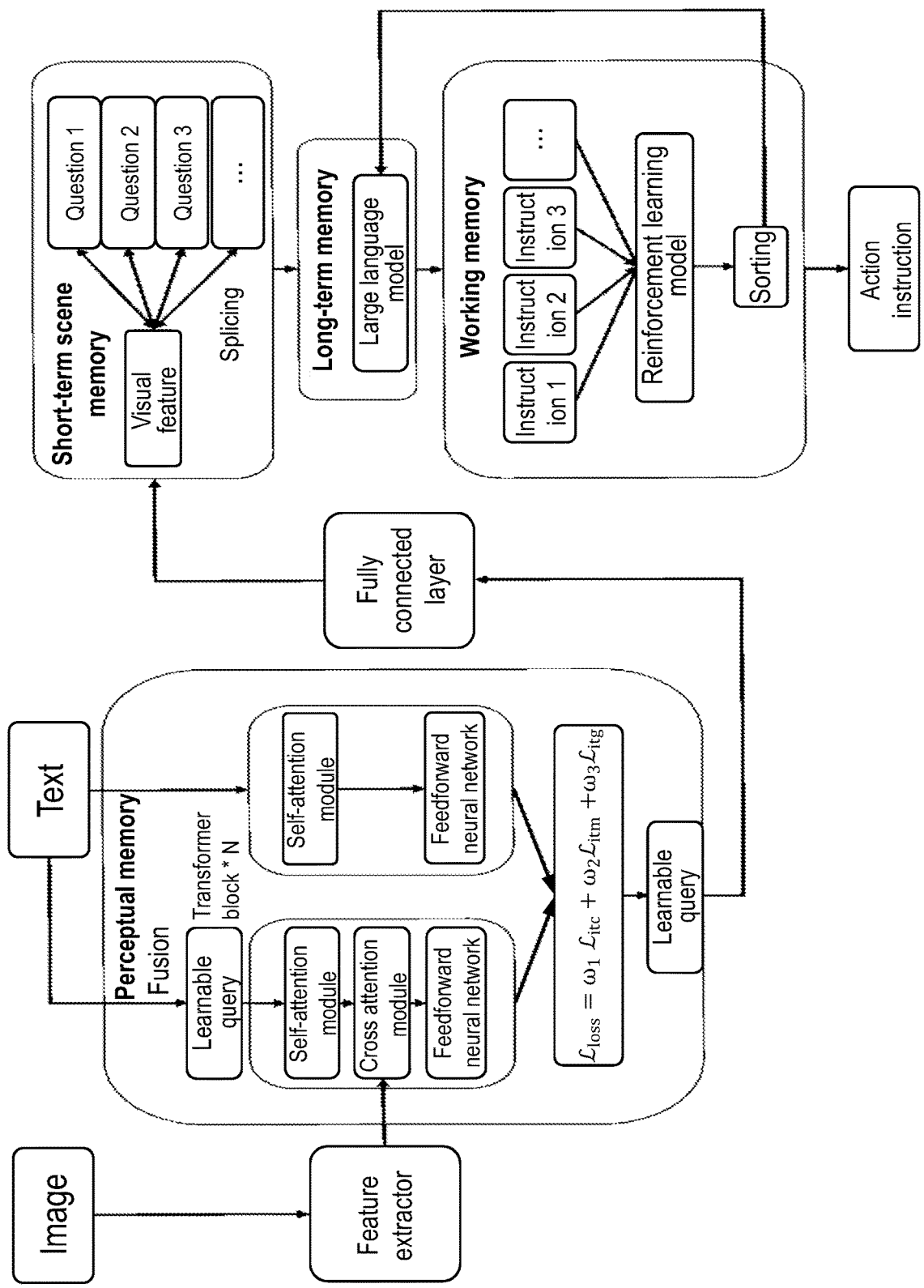
FIG. 2 is a schematic diagram of training an environment perception and decision-making model of an unmanned surface vehicle according to an embodiment of the present disclosure.

FIG. 2 is a schematic diagram of training the environment perception and decision-making model of the unmanned surface vehicle. Firstly, a large number of images that are related to an ocean and the unmanned surface vehicle, and corresponding descriptive text are collected to create an image-text pair dataset. Secondly, a low-quality image is filtered out, and the text is manually reviewed to correct an error, including removing a duplicate word and a disconnected sentence. Finally, an image-text pair obtained after manual filtering is used as training data (environmental dataset of the unmanned surface vehicle) of a vision encoder.

The vision encoder includes the image feature extractor and the BERT model. In the vision encoder, a pre-trained vision transformer is used as the image feature extractor to extract a semantic feature of the image, a pre-trained BERT model is used as a text feature extractor to extract a semantic feature of the text, and the pre-trained vision transformer and the pre-trained BERT model are frozen.

A cross attention module is added between a self-attention module of each transformer block in the pre-trained BERT model and a feedforward neural network.

A process of training the BERT model includes following operations:

The environmental dataset of the unmanned surface vehicle is collected. Each piece of sample data in the environmental dataset of the unmanned surface vehicle includes an environment image of the unmanned surface vehicle and text description information corresponding to the environment image of the unmanned surface vehicle.

The text and a learnable query are fused to obtain an initial input, and the cross-attention module is added between the self-attention module of the BERT model and the feedforward neural network. The cross-attention module plays a role of fusing the image feature and the text feature. The image feature extracted by the pre-trained vision transformer is input into the cross-attention module, and then a query containing both the text feature and the image feature is obtained through the feedforward neural network to calculate a subsequent image-text matching loss. In addition, the text is also input into the self-attention module pre-trained separately by using a BERT and into the feedforward neural network to obtain the text feature, and the text feature is combined with the image feature query obtained above to calculate an image-text contrastive loss. In addition, a mask is added to the text using the self-attention module, and the image query and masked text are used to predict masked content, to obtain an image-text generation loss. The learnable query can be obtained through training by using the above three losses. After that, an additional fully connected layer is trained at an output terminal of the model by using the image-text generation loss. The fully connected layer is used to achieve a mapping between the text feature extracted from the image and a text prompt that can be recognized by the large language model. This allows a pre-trained large language model to recognize the image feature almost without making any change, and based on this, text generation and reasoning can be carried out.

Each piece of sample data is trained, which specifically includes the following operations:

The environment image of the unmanned surface vehicle is input into a pre-trained image feature extractor, and a sample image feature is output.

The text description information corresponding to the environment image of the unmanned surface vehicle is input into the BERT model, and the sample image feature is input into the cross-attention module of each transformer block in the BERT model.

A feature output by the cross-attention module is input into the feedforward neural network to obtain a first sample image feature.

The image-text matching loss is determined based on the first sample image feature.

The text description information corresponding to the environment image of the unmanned surface vehicle is input into a pre-trained network to output a second sample image feature, where the pre-trained network includes the self-attention module and the feedforward neural network that are connected in turn.

The image-text contrastive loss is determined based on the first sample image feature and the second sample image feature.

The mask is added to the self-attention module of each transformer block in the BERT model.

The text description information corresponding to the environment image of the unmanned surface vehicle is input into a masked BERT model, the sample image feature is input into the cross-attention module of each transformer block in the BERT model, and a feature output by the cross-attention module is input into the feedforward neural network to obtain a third sample image feature.

The image-text generation loss is determined based on the third sample image feature and label data corresponding to the third sample image feature.

A hybrid loss for training the BERT model is expressed as follows:

$$\mathcal{L}_{loss} = \omega_1 \mathcal{L}_{itc} + \omega_2 \mathcal{L}_{itm} + \omega_3 \mathcal{L}_{itg}$$

In the above formula, $\omega_1$ represents a weight hyper-parameter of the image-text contrastive loss $\mathcal{L}_{itc}$, $107_2$ represents a weight hyper-parameter of the image-text matching loss $\mathcal{L}_{itm}$, $\omega_3$ represents a weight hyper-parameter of the image-text generation loss $\mathcal{L}_{itg}$, and $\mathcal{L}_{loss}$ represents a value of the hybrid loss.

In a learning process of the BERT model, a hybrid $\mathcal{L}_{loss}$ function floss is used to train the feature extractor from an image-text pair, so as to extract the image feature and transmit the image feature to the large language model to complete multimodal information transmission.

A specific calculation formula of the image-text contrastive loss $\mathcal{L}_{itc}$ is as follows:

$$\begin{cases} p_m^{i2t}(I) = \dfrac{\exp(s(I, T_m)/\tau)}{\sum_{m=1}^{M} \exp(s(I, T_m)/\tau)}, p_m^{t2i}(T) = \dfrac{\exp(s(T, I_m)/\tau)}{\sum_{m=1}^{M} \exp(s(T, I_m)/\tau)} \\ \mathcal{L}_{itc} = \dfrac{1}{2} \mathbb{E}_{(I,T) \sim D'}[H(y^{i2t}(I), p^{i2t}(I)) + H(y^{t2i}(T), p^{t2i}(T))] \end{cases}$$

In the above formula, s represents a similarity calculation function, which is intended to be realized by a cosine similarity in the present disclosure; τ represents a learnable parameter; H represents a cross entropy loss function; $p_m^{i2t}(I)$ represents an operation of calculating an image-text similarity obtained through Softmax normalization for each image in a batch; $p_m^{t2i}(T)$ represents an operation of calculating an image-text similarity obtained through the Softmax normalization for each text sentence in the batch; $y^{i2t}(I)$ represents a one-hot similarity calculated for the image by using label information (a label herein indicates whether the image and the text are an image-text pair in a same group); $y^{t2i}(T)$ represents a one-hot similarity calculated for the text by using the label information, and a final image-text contrastive loss H is defined as a cross entropy between prediction data and the label data; I represents a single image; T represents a single segment of text; $I_m$ represents an $m^{th}$ image in a same batch; $T_m$ represents an $m^{th}$ segment of text in the same batch; M represents a batch size; $\mathbb{E}_{(I,T) \sim D'}$ represents an image-text pair of one batch extracted from all data; and D' represents all the data, namely, the environmental dataset of the unmanned surface vehicle. The image-text contrastive loss $\mathcal{L}_{itc}$ is used to make positive sample pairs close to each other in feature space and negative sample pairs far away from each other in the feature space through comparative learning, so as to align the image feature and the text feature and maximize their mutual information.

A specific calculation formula of the image-text matching loss $\mathcal{L}_{itm}$ is as follows:

$$\mathcal{L}_{itm} = \mathbb{E}_{(I,T) \sim D'} H(y^{itm}, p^{itm}(I, T))$$

In the above formula, $p^{itm}$ represents an operation of determining, based on a binary prediction obtained through a Softmax function based on multimodal image and text outputs, whether the image and the text belong to positive samples or negative samples, $y^{itm}$ represents an operation of generating a two-dimensional one-hot vector based on the label information, and H represents the cross-entropy Loss function. The image-text matching loss $\mathcal{L}_{itm}$ is used to ensure that the model can correctly recognize positive and negative sample pairs by determining whether the image and the text match, thereby aligning the image feature and the text feature.

A specific calculation formula of the image-text generation loss $\mathcal{L}_{itg}$ is as follows:

$$\mathcal{L}_{itg} = \mathbb{E}_{(I,\hat{T}) \sim D'} H(y^{msk}, p^{msk}(I, \hat{T}))$$

In the above formula, $\hat{T}$ represents the masked text, $p^{msk}$ represents a prediction made for the masked content by using the image and the masked text, $y^{msk}$ represents a one-hot embedding generated based on the label to represent the masked content, and H represents the cross-entropy loss function. The image-text generation loss $\mathcal{L}_{itg}$ is mainly used to enable the model to complete masked information based on the image and the masked text, to ensure that the model can obtain a correct image feature and generate a corresponding text representation.

The BERT model is optimized based on the image-text matching loss, the image-text contrastive loss, and the image-text generation loss.

A question that can characterize a status of the unmanned surface vehicle is collected as expert knowledge. A status image collected for the unmanned surface vehicle in real time is input into the trained BERT model to obtain the corresponding image feature representation.

The using a long-term memory and in-context learning of the large language model to output the action instruction based on the plurality of answers specifically includes:
  based on the large language model, using the long-term memory and the in-context learning to output, based on the plurality of answers, an instruction set including a plurality of instructions, and outputting the action instruction based on the instruction set.

The large language model is fine tuned by using a reinforcement learning model.

A process of fine tuning the large language model includes:
  constructing an instruction training set, where sample data in the instruction training set includes input data and label data, the input data is a sample instruction set, and the label data is a sorting of each instruction in the sample instruction set based on a score in descending order;
  training a reward model by taking the sample instruction set as an input and the sorting of the sample instruction set as an output to obtain a trained reward model; and
  inputting the instruction set output by the large language model into the trained reward model, and feeding back a first-ranked instruction to the large language model as the action instruction to fine tune the large language model.

An attention layer formula used by the large language model to realize the long-term memory and the in-context learning is as follows:

$$\mathcal{F}_{ICL}(q) = Attn(V, K, q)$$
$$= W_V[X'; X] softmax\left(\frac{(W_K[X'; X])^T q}{\sqrt{d}}\right)$$

In the formula, $W_V$ and $W_K$ are transformation matrices with a dimension of d'×d, where both d and d' are constants; X' represents a token vector representation of an example part in the input; and X represents vector representations of all tokens after the example part in the input and before a last word. [X'; X] represents matrix splicing, V' represents a query vector, K represents a key vector, q represents a query vector, and $\mathcal{F}_{ICL}$ (q) represents an attention layer that plays an in-context learning role. The formula described above provides a detailed description of operational steps of an attention mechanism in a forward propagation process. By comparing the formula with a following formula, it can be concluded that the attention mechanism plays the in-context learning role in the forward propagation process.

A specific formula used by the large language model to realize the long-term memory and the in-context learning is deduced as follows:

$$\tilde{\mathcal{F}}_{ICL}(q) = W_{ZSL} + W_V X'(W_K X')^T q$$
$$= W_{ZSL} q + Linear \; Attn(W_V X', W_K X', q)$$
$$= W_{ZSL} q + \sum_i W_V x'_i((W_K x'_i)^T q)$$
$$= W_{ZSL} q + \sum_i (W_V x'_i \otimes (W_K x'_i)^T) q$$
$$= W_{ZSL} q + \Delta W_{ICL} q$$
$$= (W_{ZSL} + \Delta W_{ICL}) q$$

In the above deduction process, $W_{ZSL}$ (zsl represents zero shot learning) and $\Delta W_{ICL}$ (icl represents in-context learning) are obtained by simplifying the forward propagation process of the large language model; $W_{ZSL}$ represents a sample learning weight; $\Delta W_{ICL}$ represents an in-context learning weight; Linear Attn represents a linear attention layer; $x'_i$ represents an input of a current attention module; i represents an input order of the attention module; specific simplification steps are performed by using the fully connected layer and an attention conversion mechanism; $W_V X'$ is regarded as an output gradient corresponding to one calculation of a previous full connection; $W_K X'$ is regarded as an input corresponding to the one calculation of the previous full connection; and q represents a current input. This formula specifically describes how the attention layer implicitly completes the in-context learning in one forward propagation process of the large language model.

The reward model is trained by using a manually-annotated sorting of instructions in different scenarios as training data, to simulate humans to score each incoming instruction based on a current status of the unmanned surface vehicle, so as to provide as reasonable a score as possible for each instruction without changing a manually-annotated instruction order.

A loss function for training the reward model is expressed as follows:

$$loss(\theta) = -\frac{1}{\binom{K}{2}} E_{(x,y_w,y_l) \sim D}[\log(\sigma(r_\theta(x, y_w) - r_\theta(x, y_l)))]$$

In the above formula, $r_\theta(\;)$ represents the reward model, x represents a question and an image that are input into the large language model, $E_{(x,y_w,y_l)}$ represents an image and a question (a plurality of questions) in the instruction training set, and a first instruction and a second instruction that are corresponding to the image and the question, D represents the instruction training set, $y_w$ represents the first instruction, $y_l$ represents the second instruction, K represents a quantity of instructions in the sample instruction set, σ represents a sigmoid activation function, loss (θ) represents a loss value when the reward model is trained, θ represents all parameters of the reward model, and $$\binom{K}{2}$$

represents a quantity of combinations of any two pieces of data taken from K pieces of data, namely $C_K^2$.

An objective function for fine tuning the large language model is expressed as follows:

$$\text{objective}(\phi) = E_{(x,y) \sim D_{\pi_\phi^{RL}}} \left[ r_\theta(x, y) - \beta \log(\pi_\phi^{RL}(y \mid x)/\pi^{LLM}(y \mid x)) \right] +$$

$$\gamma E_{x \sim D_{pretrain}} \left[ \log(\pi_\phi^{RL}(x)) \right]$$

In the above formula, objective ($\Phi$) represents a value of the objective function, $\pi_\phi^{RL}$ represents the reinforcement learning model, $r_\theta(\ )$ represents the reward model, $\pi^{LLM}$ represents an initial large language model that is not fine tuned, $E_{(x,y)}$ represents an image and a question in a reinforcement learning training set, and an action instruction output by the large language model for the image and the question, $D_{\pi_\phi^{RL}}$ represents the reinforcement learning training set, $\pi_\phi^{RL}$ represents a current reinforcement learning model, $\beta$ represents a hyper-parameter for controlling a deviation degree between a current trained reinforcement learning model and an initial reinforcement learning model, x represents the image and the question that are input into the large language model, y represents the action instruction output by the large language model, $\gamma$ represents a parameter for controlling proportions of the large language model in the reinforcement learning training set and original pre-training data, $E_x$ represents the image and the question in the reinforcement learning training set, and $D_{pretrain}$ represents pre-training data used to pre-train the original large language model.

Each piece of sample data in the reinforcement learning training set and the pre-training data during the pre-training includes an image and a question, and an action instruction output by the large language model for the image and the question.

The image feature extractor is a trained vision transformer.

Embodiment 2

Figure 3:
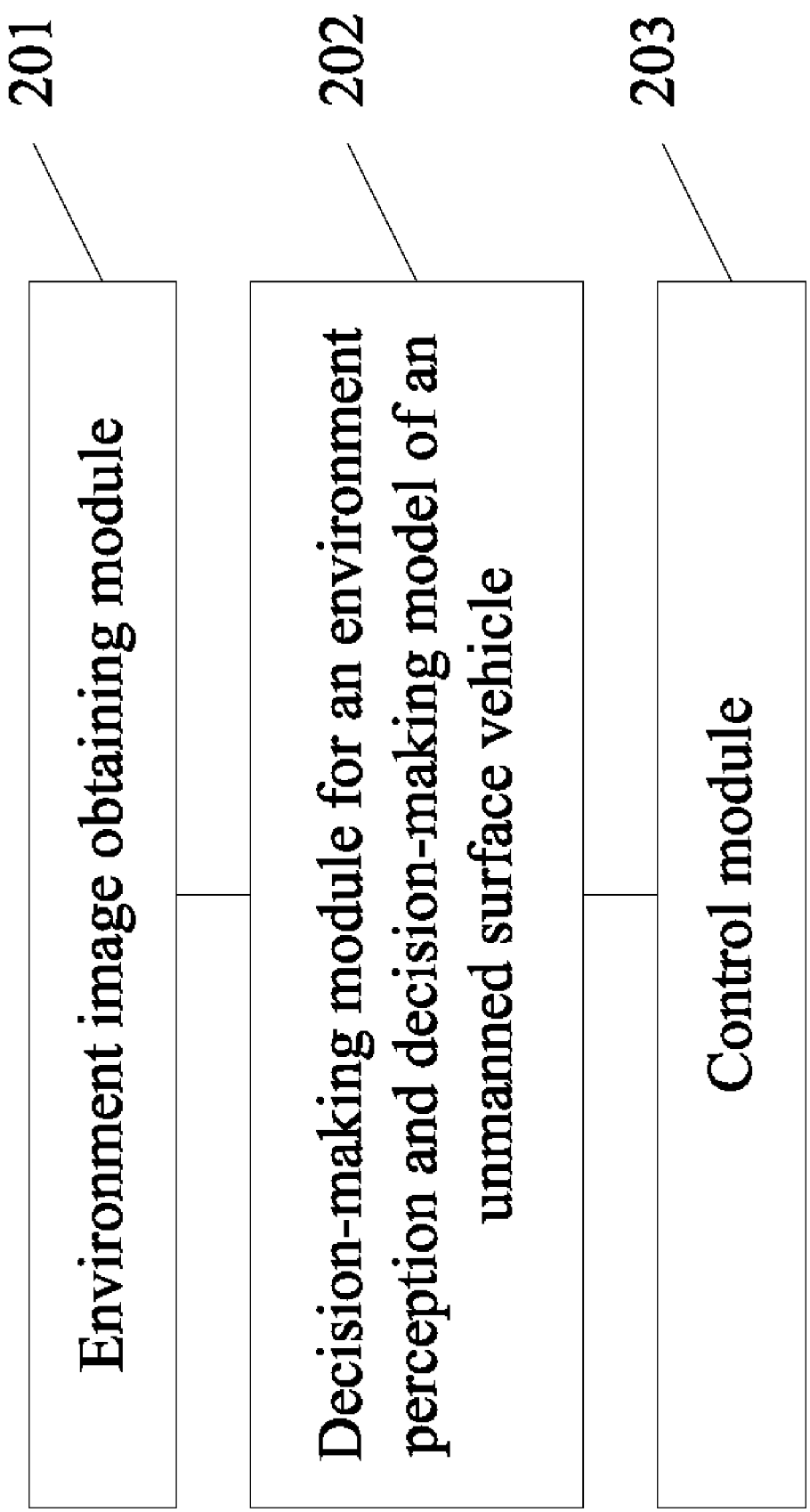
FIG. 3 is a schematic structural diagram of a brain-like memory-based environment perception and decision-making system for an unmanned surface vehicle according to an embodiment of the present disclosure.

As shown in FIG. 3, this embodiment provides a brain-like memory-based environment perception and decision-making system for an unmanned surface vehicle. The system includes:

an environment image obtaining module 201 configured to obtain an image of an environment in front of an unmanned surface vehicle;

a decision-making module 202 for an environment perception and decision-making model of the unmanned surface vehicle configured to input the image of the environment into the environment perception and decision-making model of the unmanned surface vehicle, and output an action instruction, where the environment perception and decision-making model of the unmanned surface vehicle includes an image feature extractor, a BERT model, a fully connected layer, a short-term scene memory module, and a long-term memory module that are connected in turn; and a control module 203 configured to use the action instruction to control the unmanned surface vehicle to perform an action.

The image feature extractor is configured to extract an image feature from the image of the environment. The BERT model is configured to extract an image feature representation containing a text feature from the image feature. The fully connected layer is configured to map the image feature representation onto an image query suitable for recognition by a large language model. The short-term scene memory module is configured to preset a plurality of questions, and use a short-term scene memory of the large language model to answer the plurality of questions in a specified order to obtain a plurality of answers. The long-term memory module is configured to use a long-term memory and in-context learning of the large language model to output the action instruction based on the plurality of answers. The large language model is a large language model obtained after fine tuning based on reinforcement learning.

A process of training the environment perception and decision-making model of the unmanned surface vehicle includes following steps:

Step A: Firstly, collect a large number of images that are related to an ocean and the unmanned surface vehicle, and corresponding descriptive text to create an image-text pair dataset. Secondly, a low-quality image is filtered out, and the text is manually reviewed to correct an error, including removing a duplicate word and a disconnected sentence. Finally, an image-text pair obtained after manual filtering is used as training data of a vision encoder.

Step B: In the vision encoder, use a pre-trained vision transformer as the image feature extractor to extract a semantic feature of the image, use a pre-trained BERT model as a text feature extractor to extract a semantic feature of the text, and freeze the pre-trained models.

Step C: Insert a randomly initialized cross attention module into each transformer block of the BERT model, fuse the text and a learnable query to obtain an initial input, and add a cross attention module between a self-attention module of the BERT model and a feedforward neural network, where the cross attention module plays a role of fusing the image feature and the text feature, the image feature extracted by the pre-trained vision transformer is input into the cross attention module, and then a query containing both the text feature and the image feature is obtained through the feedforward neural network to calculate a subsequent image-text matching loss. In addition, the text is also input into the self-attention module pre-trained separately by using a BERT and into the feedforward neural network to obtain the text feature, and the text feature is combined with the image feature obtained above to calculate an image-text contrastive loss. In addition, a mask is added to the self-attention module, and the image feature and masked text are used to predict masked content, to obtain an image-text generation loss. The learnable query can be obtained through training by using the above three losses. After that, an additional fully connected layer is trained at an output terminal of the model by using the image-text generation loss. The fully connected layer is used to achieve a mapping between the text feature extracted from the image and a text embedding that can be recognized by the large language model. This allows a pre-trained large language model to recognize the image feature almost without making any change, and based on this, text generation and reasoning can be carried out.

In the step C, a definition in a trained hybrid loss function is as follows:

$$\mathcal{L}_{loss} = \omega_1 \mathcal{L}_{itc} + \omega_2 \mathcal{L}_{itm} + \omega_3 \mathcal{L}_{itg}$$

In the above formula, $\omega_1$ represents a weight hyper-parameter of the image-text contrastive loss $\mathcal{L}_{itc}$, $\omega_2$ represents a weight hyper-parameter of the image-text matching loss $\mathcal{L}_{itm}$, and $\omega_3$ represents a weight hyper-parameter of the image-text generation loss $\mathcal{L}_{itg}$.

Step D: Collect a question that can characterize a status of the unmanned surface vehicle as expert knowledge. A status image collected for the unmanned surface vehicle in real time is input into a trained BERT model to obtain the corresponding image feature query.

Step E: After sorting the collected question in the step D, splice the question and the image query gradually based on a difficulty level in ascending order, and input spliced information to the language model, where the input of the question based on the difficulty level in the ascending order utilizes a short-term scene memory of the large language model, and based on a progressive setting based on the difficulty level, an answer to a previous question each time is used as a short-term scene memory to provide assistance for an answer to a next question. Next, an attention layer in the large language model can be used to implicitly optimize a parameter in a forward reasoning process, thereby achieving a long-term memory (corresponding to a long-term memory in the flowchart) and in-context learning for input text, and further guiding the language model to fuse multi-modal information and the long-term memory to obtain various possible instructions for a next action of the unmanned surface vehicle.

Step F: Find a professional to analyze an instruction set obtained in the step E and rank rationality of each instruction in the instruction set. Finally, all kinds of images and questions and their corresponding instructions are sorted to obtain a small-scale dataset to simulate a working memory of a human brain. A sorting of the instruction set is regarded as label information.

Step G: Train a reward model by using the small-scale dataset collected in the step F, where the reward model is trained by using a manually-annotated sorting of instructions in different scenarios as training data, to simulate humans to score each incoming instruction based on a current status of the unmanned surface vehicle, so as to provide as reasonable a score as possible for each instruction without changing a manually-annotated instruction order.

Further, in the step G, a loss function for training the reward model is defined as follows:

$$\text{loss}(\theta) = -\frac{1}{\binom{K}{2}} E_{(x, y_w, y_l) \sim D} [\log(\sigma(r_\theta(x, y_w) - r_\theta(x, y_l)))]$$

In the above formula, $r_\theta$ represents the reward model, x represents a question and an image that are input into the model, $E_{(x,y_w,y_l,D)}$ represents an image and a question in the small-scale dataset and their corresponding two instructions, $y_w$ and $y_l$ represent output instructions that are obtained, K represents a quantity of instructions in the instruction set, and σ represents a sigmoid activation function. The loss function is specifically used to select instructions $y_w$ and $y_l$ randomly from the instruction set. When a sorting of the instruction $y_w$ is higher than that of the instruction $y_l$, the reward model is expected to score the instruction $y_w$ higher than the instruction $y_l$. Therefore, a manually-assigned sorting is ingeniously taken as the loss function that can be used to train the model.

Step H: Use a trained reward model to train a reinforcement learner, and fine tune the large language model in the step E again, such that an output of the large language model can get a higher score in the reward function. A finally trained model is used to obtain a final instruction under current sea conditions, and then the unmanned surface vehicle completes autonomous decision-making according to the obtained instruction.

Further, in the step H, an objective function for training the reinforcement learner is defined as follows:

$$\text{objective}(\phi) = E_{(x,y) \sim D_{\pi_\phi^{RL}}} \left[ r_\theta(x, y) - \beta \log(\pi_\phi^{RL}(y \mid x) / \pi^{LLM}(y \mid x)) \right] +$$

$$\gamma E_{x \sim D_{pretrain}} [\log(\pi_\phi^{RL}(x))]$$

In the above formula, $\pi_\phi^{RL}$ represents a reinforcement learning model, $r_\theta$ represents the reward model in the step G, and $\pi_{LLM}$ represents an initial large language model that is not fine tuned. In the objective function, a first item $r_\theta(x, y)$ is intended to enable the instruction trained by the model to obtain a higher score. It is worth noting that data sampled in $E_{(x,y)}$ can be regarded as a status in a classic reinforcement learning algorithm and changes with update of the model. A second term $\beta \log (\pi_\phi^{RL}(y|x)/\pi^{LLM}(y|x))$ is a regular term, which constrains the reinforcement learning model by using Kullback-Leibler (KL) divergence of probability distribution of a new model learned through reinforcement learning and the initial model, such that the learned reinforcement learning model does not deviate from the initial model excessively. A third term $\gamma E_{x \sim D_{pretrain}} [\log (\pi_\phi^{RL}(x))]$ is a loss function for pre-training the language model, such that the model obtained after the reinforcement learning can also achieve a good effect for original pre-training data.

Each embodiment of the present specification is described in a progressive manner, each embodiment focuses on the difference from other embodiments, and the same and similar parts between the embodiments may refer to each other. Since the system disclosed in the embodiments corresponds to the method disclosed in the embodiments, the description is relatively simple, and reference can be made to the method description.

Specific examples are used herein to explain the principles and implementations of the present disclosure. The foregoing description of the embodiments is merely intended to help understand the method of the present disclosure and its core ideas; besides, various modifications may be made by a person of ordinary skill in the art to specific implementations and the scope of application in accordance with the ideas of the present disclosure. In conclusion, the content of the present specification shall not be construed as limitations to the present disclosure.

What is claimed is:

1. A brain-like memory-based environment perception and decision-making method for an unmanned surface vehicle, comprising:
   obtaining an image of an environment in front of an unmanned surface vehicle;
   inputting the image of the environment into an environment perception and decision-making model of the unmanned surface vehicle, and outputting an action instruction, wherein the environment perception and decision-making model of the unmanned surface vehicle comprises an image feature extractor, a Bidirectional Encoder Representations from Transformers (BERT) model, a fully connected layer, a short-term scene memory module, and a long-term memory module that are connected in turn; and
   using the action instruction to control the unmanned surface vehicle to perform an action; wherein the image feature extractor is configured to extract an image feature from the image of the environment; the BERT model is configured to extract an image feature representation containing a text feature from the image feature; the fully connected layer is configured to map the image feature representation onto an image query suitable for recognition by a large language model; the short-term scene memory module is configured to preset a plurality of questions, and use a short-term scene memory of the large language model to answer the plurality of questions in a specified order to obtain a plurality of answers; the long-term memory module is configured to use a long-term memory and in-context learning of the large language model to output the action instruction based on the plurality of answers; and the large language model is a large language model obtained after fine tuning based on reinforcement learning.

2. The brain-like memory-based environment perception and decision-making method for an unmanned surface vehicle according to claim 1, wherein the BERT model is a trained BERT model, and a cross attention module is added between a self-attention module of each transformer block in the BERT model and a feedforward neural network; and
a process of training the BERT model comprises:
collecting an environmental dataset of the unmanned surface vehicle, wherein each piece of sample data in the environmental dataset of the unmanned surface vehicle comprises an environment image of the unmanned surface vehicle and text description information corresponding to the environment image of the unmanned surface vehicle;
training each piece of sample data, which specifically comprises:
inputting the environment image of the unmanned surface vehicle into a pre-trained image feature extractor, and outputting a sample image feature;
inputting the text description information corresponding to the environment image of the unmanned surface vehicle into the BERT model, and inputting the sample image feature into the cross-attention module of each transformer block in the BERT model;
inputting a feature output by the cross-attention module into the feedforward neural network to obtain a first sample image feature;
determining an image-text matching loss based on the first sample image feature;
inputting the text description information corresponding to the environment image of the unmanned surface vehicle into a pre-trained network to output a second sample image feature, wherein the pre-trained network comprises the self-attention module and the feedforward neural network that are connected in turn;
determining an image-text contrastive loss based on the first sample image feature and the second sample image feature;
adding a mask to the self-attention module of each transformer block in the BERT model;
inputting the text description information corresponding to the environment image of the unmanned surface vehicle into a masked BERT model, inputting the sample image feature into the cross-attention module of each transformer block in the BERT model, and inputting a feature output by the cross-attention module into the feedforward neural network to obtain a third sample image feature;
determining an image-text generation loss based on the third sample image feature and label data corresponding to the third sample image feature; and
optimizing the BERT model based on the image-text matching loss, the image-text contrastive loss, and the image-text generation loss.

3. The brain-like memory-based environment perception and decision-making method for an unmanned surface vehicle according to claim 1, wherein the using a long-term memory and in-context learning of the large language model to output the action instruction based on the plurality of answers specifically comprises:
based on the large language model, using the long-term memory and the in-context learning to output, based on the plurality of answers, an instruction set comprising a plurality of instructions, and outputting the action instruction based on the instruction set.

4. The brain-like memory-based environment perception and decision-making method for an unmanned surface vehicle according to claim 3, wherein the large language model is fine tuned by using a reinforcement learning model; and
a process of fine tuning the large language model comprises:
constructing an instruction training set, wherein sample data in the instruction training set comprises input data and label data, the input data is a sample instruction set, and the label data is a sorting of each instruction in the sample instruction set based on a score in descending order;
training a reward model by taking the sample instruction set as an input and the sorting of the sample instruction set as an output to obtain a trained reward model; and
inputting the instruction set output by the large language model into the trained reward model, and feeding back a first-ranked instruction to the large language model as the action instruction to fine tune the large language model.

5. The brain-like memory-based environment perception and decision-making method for an unmanned surface vehicle according to claim 4, wherein a loss function for training the reward model is expressed as follows:

$$\text{loss}(\theta) = -\frac{1}{\binom{K}{2}} E_{(x,y_w,y_l) \sim D}[\log(\sigma(r_\theta(x, y_w) - r_\theta(x, y_l)))]$$

wherein $r_\theta(\ )$ represents the reward model, x represents a question and an image that are input into the large language model, $E_{(x,y_w,y_l)}$ represents an image and a question in the instruction training set, and a first instruction and a second instruction that are corresponding to the image and the question, D represents the instruction training set, $y_w$ represents the first instruction, $y_l$ represents the second instruction, K represents a quantity of instructions in the sample instruction set, $\sigma$ represents a sigmoid activation function, loss($\theta$) represents a loss value when the reward model is trained, and $\theta$ represents all parameters of the reward model.

6. The brain-like memory-based environment perception and decision-making method for an unmanned surface vehicle according to claim 4, wherein an objective function for fine tuning the large language model is expressed as follows:

$$\text{objective}(\phi) = E_{(x,y)\sim D_{\pi_\phi^{RL}}}\left[r_\theta(x, y) - \beta\log\left(\pi_\phi^{RL}(y \mid x)/\pi^{LLM}(y \mid x)\right)\right] +$$
$$\gamma E_{x\sim D_{pretrain}}\left[\log\left(\pi_\phi^{RL}(x)\right)\right]$$

wherein objective (Φ) represents a value of the objective function, $r_\theta(\ )$ represents the reward model, $\pi_{LLM}$ represents an initial large language model that is not fine tuned, $E_{(x,y)}$ represents an image and a question in a reinforcement learning training set, and an action instruction output by the large language model for the image and the question, $D_{\pi_\phi^{RL}}$ represents the reinforcement learning training set, $\pi_\phi^{RL}$ represents a current reinforcement learning model, β represents a hyperparameter for controlling a deviation degree between a current trained reinforcement learning model and an initial reinforcement learning model, x represents an image and a question that are input into the large language model, y represents the action instruction output by the large language model, γ represents a parameter for controlling proportions of the large language model in the reinforcement learning training set and original pre-training data, $E_x$ represents an image and a question in the reinforcement learning training set, and $D_{pretrain}$ represents pre-training data when the original large language model is pre-trained.

7. The brain-like memory-based environment perception and decision-making method for an unmanned surface vehicle according to claim 1, wherein the image feature extractor is a trained vision transformer.

8. A brain-like memory-based environment perception and decision-making system for an unmanned surface vehicle, comprising:

an environment image obtaining module configured to obtain an image of an environment in front of an unmanned surface vehicle;

a decision-making module for an environment perception and decision-making model of the unmanned surface vehicle configured to input the image of the environment into the environment perception and decision-making model of the unmanned surface vehicle, and output an action instruction, wherein the environment perception and decision-making model of the unmanned surface vehicle comprises an image feature extractor, a BERT model, a fully connected layer, a short-term scene memory module, and a long-term memory module that are connected in turn; and a control module configured to use the action instruction to control the unmanned surface vehicle to perform an action; wherein the image feature extractor is configured to extract an image feature from the image of the environment; the BERT model is configured to extract an image feature representation containing a text feature from the image feature; the fully connected layer is configured to map the image feature representation onto an image query suitable for recognition by a large language model; the short-term scene memory module is configured to preset a plurality of questions, and use a short-term scene memory of the large language model to answer the plurality of questions in a specified order to obtain a plurality of answers; the long-term memory module is configured to use a long-term memory and in-context learning of the large language model to output the action instruction based on the plurality of answers; and the large language model is a large language model obtained after fine tuning based on reinforcement learning.

* * * * *